Patented Mar. 16, 1926.

1,576,529

UNITED STATES PATENT OFFICE.

WILLIAM MENDEL, OF BEVERLY, NEW JERSEY.

MANUFACTURE OF FILAMENTS AND FILMS FROM VISCOSE.

No Drawing. Application filed April 29, 1925. Serial No. 26,825.

*To all whom it may concern:*

Be it known that I, WILLIAM MENDEL, a citizen of the United States, residing at Beverly, in the county of Burlington and State of New Jersey, have invented a certain new and useful Improvement in the Manufacture of Filaments and Films from Viscose, whereof the following is a specification.

This invention includes methods and means for chemically purifying cellulose products which are primarily formed by conversion of liquid viscose (cellulose sulphocarbonate) to coagulated or precipitated cellulose complex, in any manner or by any means; for instance, by progressively projecting a stream of viscose into an aqueous solution containing a suitable acid, for instance, sulphuric or hydrochloric acid, or by subjecting viscose to the action of an acid salt in aqueous solution, either with or without neutral salts or dehydrators, or both; or by the mere action of heat without the employment of such acids or salts.

It is characteristic of all such products that the cellulose hydrate is not in a pure state, but mixed with free sulphur and its derivatives, for instance, sulphides, sulphites, sulphates and thiosulphates. Some of such impurities are soluble, but others, particularly if an acid bath has been used, are insoluble and increasingly difficult to remove, in accordance with the thickness of the filament or film. Sulphur and its derivatives in such products, detract from all of the qualities which make the latter valuable, especially their luster, strength and elasticity, and the presence of such deleterious matter is manifested by the opacity of the product and the dullness of its appearance.

Heretofore, attempts have been made to remove such impurities by treatment of such products with sulphites and sulphides, particularly the latter, and by the use of reducers such as bisulphite or formaldehyde, and oxidizers such as bleaching powder, permanganate of potash or sodium peroxide. However, the action of such materials is incomplete and extremely slow and, consequently, unsatisfactory.

I have discovered that such sulphurous impurities may be eliminated from such cellulose hydrate products by reaction of tri-sodium phosphate ($Na_3PO_4$) therewith; as such reaction converts the sulphur to soluble poly-sulphides and thio-sulphates. Therefore, my invention consists in the use of such reagent to effect the removal of such sulphurous impurities from such products.

My invention is especially advantageous in the manufacture of artificial horsehair and artificial silk filaments. If such products have been formed in an acid bath, they may be immediately subjected to the action of the tri-sodium phosphate. However, if such filaments have been formed in a non-acid bath, they should be allowed to age until insoluble in tri-sodium phosphate solution before being subjected to my process herein contemplated. For instance, filaments formed in bi-sulphite should not be subjected to the action of tri-sodium phosphate until the lapse of, say, four hours. Although the purification and clarification herein contemplated are effected most rapidly when the cellulose hydrate products are submerged in a hot saturated solution of tri-sodium phosphate; such a solution quickly becomes clogged with the soluble products of the reaction. Therefore, I find it preferable to use dilute solutions because, although a longer time is required, the desired result is more economically attained, but it is to be understood that tri-sodium phosphate is efficient for the purpose contemplated at any temperature and in any state of dilution.

The action of my invention may be effected with great rapidity. For instance, a filament weighing 1800 denier which has been formed in an eight per cent sulphuric acid bath, and is then of a dull yellowish-white chalky appearance; when boiled for two minutes in a saturated aqueous solution of tri-sodium phosphate becomes almost as clear and transparent as glass and, when dried, forms a 300 denier hair, superior in transparency, strength and elasticity to filaments of that size which have been subjected to the action of ordinary reagents for a much longer time. Of course, the reaction in accordance with my invention is more rapid with filaments of smaller diameter.

Therefore, I find it preferable to utilize my invention as follows: In order that the reagent may uniformly penetrate large masses of filaments; I run the latter directly from the reversion or precipitation bath in which they have been solidified, into suitable open top containers. I then subject such massed filaments to the action of three per cent aqueous solution of tri-sodium phosphate ($Na_3PO_4$) at about 50° C., for one and a half to two hours, preferably with intermissions during which the filaments are temporarily separated from the purifying solution and again exposed thereto; for the reason that less time is required to attain the desired result by such intermittent treatment than by a single treatment during which the viscose products remain covered by the solution of tri-sodium phosphate. Thereafter, such sulphurous impurities, which have thus been rendered soluble, may be readily removed from the cellulose hydrate products by merely rinsing the latter in water. The filaments are then dried, preferably under more or less tension. The filaments thus treated are purified and clarified and excel in brilliancy of luster, strength and elasticity, but retain a natural greenish-yellow tint which is negligible if the filaments are to be dyed to a darker tint. However, if it is desired to dye such filaments with light colors, such natural greenish-yellow hue is easily removed by bleaching the filaments either before or after they are dried.

Although I have described what I consider a preferable method of carrying out my invention, it is to be understood that the latter includes any and every use of tri-sodium phosphate as a purifier of any kind of product formed from viscose, applied in any manner, in any strength, and at any temperature. For instance, such products may be treated in accordance with my invention during or after their subjection to a dyeing operation.

Therefore, I do not desire to limit myself to the precise details of construction, arrangement or procedure herein set forth, as it is obvious that various modifications may be made therein without departing from the essential features of my invention as defined in the appended claims.

However, this application includes claims for the species of my invention applicable to cellulose products which have been primarily formed by treatment with acids; specific claims for other processes wherein such products have been primarily formed in baths which do not include acid, or merely by heat, are respectively included in applications for Letters Patent of the United States, Serial Nos. 26,826 and 26,827 filed April 29, 1925, and copending herewith.

I claim:

1. The process of treating products of cellulose for the removal of undesirable sulphur bearing constituents thereof, which consists in subjecting the same to the action of trisodium phosphate ($Na_3PO_4$).

2. The process of treating viscose which has been subjected to a solidifying process in an aciduous bath, which consists in subjecting the solidified product to the action of tri-sodium phosphate before drying it.

3. The method of purifying viscose products, which consists in eliminating sulphur and its derivatives therefrom by subjecting said products to an aqueous solution of tri-sodium phosphate.

4. The process of manufacturing filaments and films from viscose which includes solidifying such viscose in an acid bath and treating the resultant product with tri-sodium phosphate in aqueous solution.

5. The process of manufacturing articles from viscose by precipitating such viscose, in any manner, and subjecting the same to the action of tri-sodium phosphate.

6. The process of manufacturing articles from viscose by precipitating such viscose, in any manner, and subjecting the same to the action of tri-sodium phosphate, intermittently.

7. The process of treating viscose, which consists in coagulating it in an aqueous solution of any suitable acid, and eliminating any sulphur derivatives from the cellulose hydrate thus produced, by subjecting the latter to the action of tri-sodium phosphate, in aqueous solution.

8. The method of manufacturing artificial silk filaments from viscose which consists in coagulating viscose by projecting a fine filament thereof into an acid coagulating medium and thence into an aqueous solution containing $PO_4$ ions.

9. The method of manufacturing artificial silk filaments from viscose which consists in coagulating viscose by projecting a fine filament thereof into an acid coagulating medium and thence into an aqueous solution containing $PO_4$ ions associated with other ions capable of affecting such coagulation.

10. The method of manufacturing artificial silk filaments from viscose which consists in coagulating viscose by projecting a fine filament thereof into an acid coagulating medium and thence into an aqueous solution containing $PO_4$ ions, resultant from inclusion of tri-sodium phosphate ($Na_3PO_4$) in such solution.

11. The method of manufacturing artificial silk filaments from viscose which consists in coagulating viscose by projecting a fine filament thereof into an acid coagulating medium and thence into an aqueous solution containing $PO_4$ ions, resultant from inclusion of tri-sodium phosphate ($Na_3PO_4$)

in such solution, with another solute capable of affecting such coagulation.

12. The method of manufacturing artificial silk from viscose which consists in projecting a filament of the latter into an aqueous solution containing sulphuric acid and thence into an aqueous solution in which tri-sodium phosphate ($Na_3PO_4$) has been dissolved.

In testimony whereof, I have hereunto signed my name at Burlington, New Jersey, this twenty seventh day of April, 1925.

WILLIAM MENDEL.